United States Patent
Arai

[19]

[11] Patent Number: 5,845,134
[45] Date of Patent: Dec. 1, 1998

[54] SUSPEND/RESUME CONTROL METHOD AND SYSTEM

[75] Inventor: Makoto Arai, Tokyo, Japan

[73] Assignee: Kabushiki Kaisha Toshiba, Japan

[21] Appl. No.: 143,051

[22] Filed: Oct. 29, 1993

[30] Foreign Application Priority Data

Oct. 29, 1992 [JP] Japan .................................. 4-291526

[51] Int. Cl.[6] .................................................. G06F 1/32
[52] U.S. Cl. .................................. 395/750; 364/DIG. 1; 364/273; 364/273.1; 364/273.2; 364/273.3; 395/700
[58] Field of Search ................................... 395/750, 650, 395/700, 575; 364/707

[56] References Cited

U.S. PATENT DOCUMENTS

| | | | |
|---|---|---|---|
| 4,763,333 | 8/1988 | Byrd | 371/66 |
| 4,912,620 | 3/1990 | Briggs | 395/650 |
| 5,021,983 | 6/1991 | Nguyen et al. | 364/707 |
| 5,230,074 | 7/1993 | Canova, Jr. et al. | 395/750 |
| 5,297,282 | 3/1994 | Meilak et al. | 395/700 |
| 5,303,171 | 4/1994 | Belt et al. | 364/707 |
| 5,339,437 | 8/1994 | Yuen | 395/700 |
| 5,375,230 | 12/1994 | Fujimori | 395/575 |
| 5,388,265 | 2/1995 | Volk | 395/750 |
| 5,394,527 | 2/1995 | Fakhruddin et al. | 395/275 |
| 5,404,546 | 4/1995 | Stewart | 395/750 |
| 5,414,860 | 5/1995 | Canova, Jr. et al. | 395/750 |

*Primary Examiner*—Ayaz R. Sheikh
*Attorney, Agent, or Firm*—Oblon, Spivak, McClelland, Maier & Neustadt, P.C.

[57] ABSTRACT

When an OFF operation of a power switch is detected, suspend processing of the special OS is executed to save user data in a hard disk. Upon completion of the suspend processing of the special OS, suspend processing of the BIOS is executed in turn, thereby saving the status data of a computer system in an SM-RAM, and turning off the power supply of the computer system. In a suspend control system of this invention, both the special OS suspend processing and the BIOS suspend processing are executed in response to the OFF operation of the power switch, thereby executing the processing for saving user data in the hard disk, in conjunction with the processing for saving status data of the computer system in the SM-RAM.

16 Claims, 6 Drawing Sheets

SUSPEND/RESUME CONTROL METHOD AND SYSTEM

BACKGROUND OF THE INVENTION

1. Field of the Invention

The present invention relates to a suspend/resume method and system in a laptop or notebook type portable computer or a pen input type portable computer.

2. Description of the Related Art

In recent years, a variety of laptop or notebook type portable computers and pen input type portable computers have been developed.

A portable computer of this type has various power save modes for saving electric power of a computer system so as to prolong the battery operating time. A suspend mode is one of the power save modes which requires the least power consumption. More specifically, when a computer system is in a suspend mode, all units in the system other than a memory which stores data necessary for restarting an application program are set in a power-down state.

Data saved in the memory include CPU status data and status data of various peripheral LSIs immediately before the computer system is set in the suspend mode. The memory also stores user data created by the application program.

Save processing of system data is executed by a suspend routine included in a BIOS (basic input/output system program). The BIOS is used for controlling hardware devices in the system in response to a request from an operating system (OS), and includes device drivers for controlling various hardware devices in the system. The suspend routine in the BIOS is started in response to an interrupt signal indicating an OFF operation of a power switch, and involves the steps of saving status data of CPU registers and various peripheral LSIs in the memory, and turning off the power supply of the system.

The power supply to the memory is maintained by a battery during the power-OFF period of the system. For this reason, the system can be resumed to a state immediately before the suspend mode is set without losing the status data of the system and the user data.

However, if the remaining capacity of the battery becomes low when the system is in the suspend mode, data in the memory are lost. In this case, the system cannot be resumed to a state immediately before the suspend mode is set, and user data such as document data developed in the memory are lost.

In order to prevent user data from being lost, user data in the memory have to be saved on a disk before the system enters the suspend mode.

Thus, in recent years, an OS, which is designed to operate in a protect mode and save user data stored in a main memory in a disk, has been developed.

When this OS is utilized, user data created by an application program, which operates in the protect mode, can be saved in a disk before the system is set in the suspend mode.

However, hardware status data of the system must be saved not by the OS but by the above-mentioned BIOS for the following reason. Since hardware configurations of computer systems are different for different products, if the OS were programmed to have a function of saving hardware status data, the OS would have to be modified for each product in correspondence with the hardware configuration. The modification required would increase the demand on the programmer, as well as in the cost of development.

Therefore, when the system enters the suspend mode, it is preferable that system status data are saved on the memory by the suspend function of the BIOS, and user data in the memory are saved in a disk by the suspend function of the OS.

However, a conventional system has no interface between the BIOS suspend function and the OS suspend function, so these functions cannot operate in conjunction with each other.

For this reason, even when using an OS with the function of saving user data on a disk, the function cannot be effectively utilized, and the problem of user data loss caused by a low remaining battery capacity in the suspend mode remains unresolved.

SUMMARY OF THE INVENTION

It is an object of the present invention to provide a suspend/resume control method and system, which can realize suspend processing by effectively utilizing a user data save function provided by the OS, and can prevent user data from being lost due to a low remaining battery capacity.

In order to achieve the above object, according to the present invention, a suspend control system for a computer system comprises storage means for processing data of the computer system, system management means, inserted between hardware of the system and an application program, for managing the system, the system management means having first suspend means for executing first suspend processing for saving user data stored in the storage means in a secondary storage device, second suspend means for executing second suspend processing for saving status data of the computer system in the storage means and turning off the system, power switch means for controlling an ON/OFF state of a power supply of the computer system, means for causing the first suspend means of the system management means to execute the first suspend processing in response to the OFF state of the power switch means, and means for causing the second suspend means to execute the second suspend processing in response to the end of execution of the first suspend processing by the first suspend means.

In this suspend control system, when the power switch means is turned off, the first suspend means of the system management means executes the first suspend processing. In the first suspend processing, user data stored in the storage means is saved in the secondary storage device. Upon completion of the first suspend processing, the second suspend means executes the second suspend processing in response to the end of the first suspend processing. In the second suspend processing, status data of the computer system are saved in the storage means, and the computer system is turned off. In this manner, when the power switch means in this suspend control system is turned off, the first and second suspend processing operations are executed, whereby processing for saving user data in the secondary storage device and processing for saving status data of the computer system in the storage means are executed in conjunction with each other. Therefore, even when data in the storage means are lost due to a low remaining capacity of a battery during the power-OFF period of the system, user data such as document data created by an application program are left in the secondary storage device. For this reason, loss of user data due to a decrease in remaining capacity of the battery can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
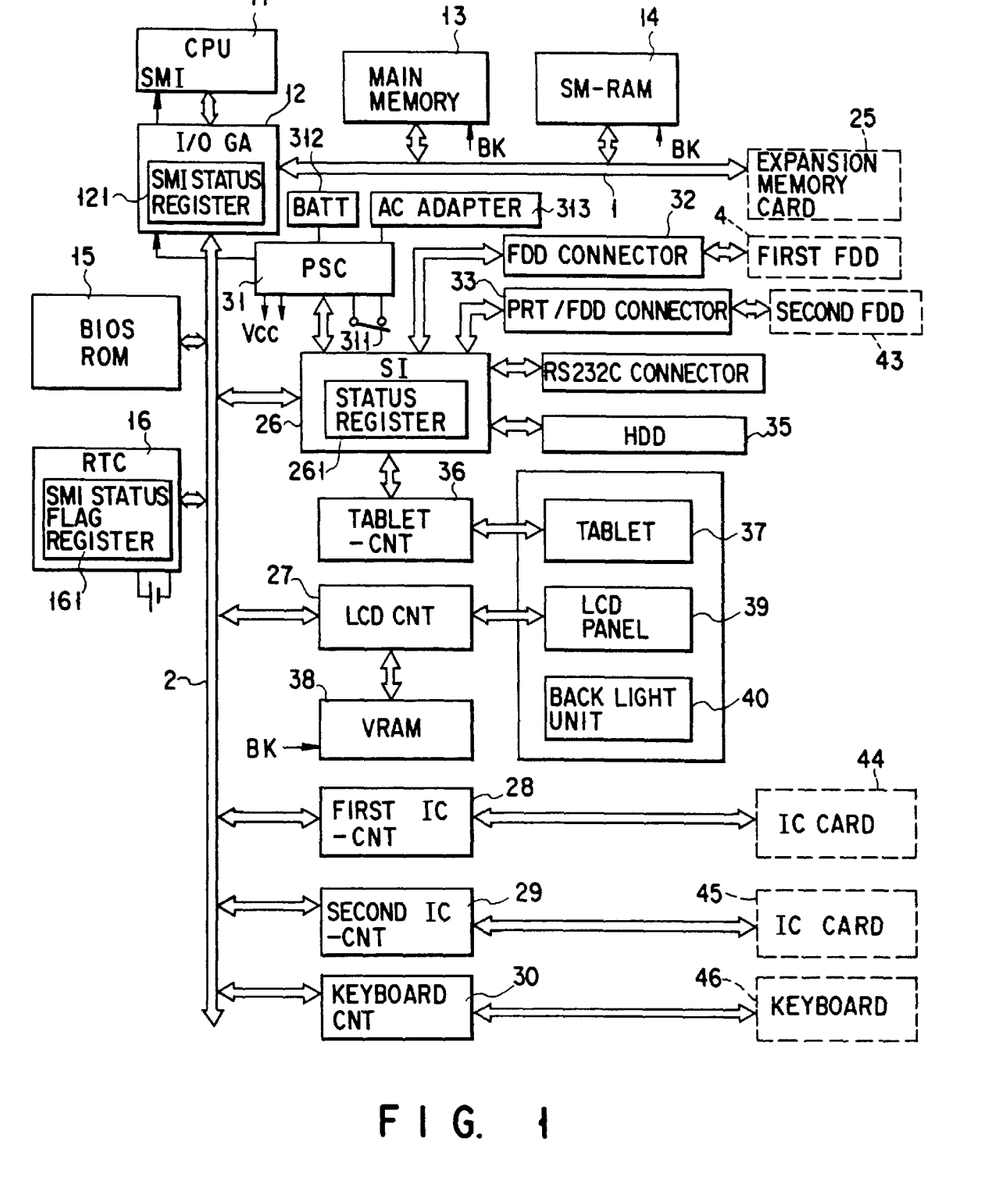
FIG. 1 is a block diagram showing a system arrangement of a portable computer system according to an embodiment of the present invention.

The preferred embodiment of the present invention will be described below with reference to the accompanying drawings. FIG. 1 shows a system arrangement of a portable computer according to an embodiment of the present invention.

The portable computer is a pen input type personal computer having a liquid crystal display panel, and a transparent tablet arranged integrally with the display panel. This system comprises a CPU 11, an input/output gate array (I/O GA) 12, a main memory 13, and a system management RAM (SM-RAM) 14. The main memory 13 and the SM-RAM 14 are connected to a local bus 1.

This system also comprises a BIOS-ROM 15, a realtime clock (RTC) 16, a super integration circuit (SI) 26, a liquid crystal controller (liquid crystal CNT) 27, first and second IC card controllers (IC-CNTS) 28 and 29, and a keyboard controller (keyboard CNT) 30. These components are connected to an ISA (International Standard Association) system bus 2.

The CPU 11 adopts the microprocessor 80386SL (commercially available from Intel Corp., USA) or its compatible processor. The CPU 11 can operate in three different operation modes, i.e., a real mode, a protect mode, and a virtual 86 mode. In the real mode, the CPU 11 can access a memory space at a maximum of 1 Mbytes, and a physical address is determined by an offset value from a base address represented by a segment register. In the protect mode, the CPU 11 can access a memory space at a maximum of 16 Mbytes per task, and a physical address is determined using an address mapping table called a descriptor table. In the virtual 86 mode, a program programmed to operate in the real mode can operate in the protect mode, and a program for the real mode is processed as one task in the protect mode.

The CPU 11 also has a power save mode for achieving low power consumption, i.e., for setting various I/Os during idling in a power-down state. The power save mode includes a suspend mode, which is the power save mode with the least power consumption. In the suspend mode, all units in the system other than a memory which stores data necessary for restarting an application program are set in a power-down state. The suspend function can be started by utilizing a system management interrupt (SMI) supported by the above-mentioned microprocessor 80386SL or its compatible processor.

In addition to the SMI, the CPU 11 also has an NMI (Non-Maskable Interrupt) and an INTR (Maskable Interrupt) as interrupts. The SMI is a kind of NMI, but has a priority higher than the above-mentioned NMI and INTR. When an interrupt request input SMI of the CPU 11 is activated, various SMI service routines associated with the power save mode can be started.

The SMI service routines are roughly classified into a suspend processing routine and a resume processing routine. The suspend processing routine is executed to set the system in the suspend mode, as described above. In this routine, system status data are saved in the SM-RAM 14, and user data are saved in a disk. The resume processing routine is executed to resume the system from the suspend mode, and to restart an application program at a state immediately before the suspend mode is set. In this routine, the saved system status data and user data are restored.

The I/O gate array 12 is a special-purpose logic for realizing a support function of the CPU 11 and memories, and executes I/O control among the main memory 13, the SM-RAM 14, an expansion memory card 25, and the CPU 11 connected to the local bus 1, as well as between various units connected to the system bus 2 and the CPU 11. The I/O gate array 12 incorporates units for realizing functions necessary for system control, i.e., a DMA controller for direct memory access control, a programmable interrupt controller (PIC), a programmable interval timer (PIT), and a serial input/output controller (SIO).

Communications between the CPU 11 and the I/O gate array 12 are executed via special-purpose interface lines. Interface signals between the CPU 11 and the I/O gate array 12 include, e.g., a signal for controlling the SMI function of the CPU 11.

More specifically, the interrupt request input SMI of the CPU 11 receives an active-low SMI signal output from the I/O gate array 12. This SMI signal is generated in response to, e.g., a request from the internal timer of the I/O gate array 12, or a request from an external unit such as the RTC 16, a power supply controller (PSC) 31, or the like. For example, the request from the power supply controller 31 is generated when a power switch 311 for controlling an ON/OFF state of the power supply of the system is turned off, when a decrease in remaining capacity of a battery 312 (low battery state) is detected, and so on.

Figure 2:
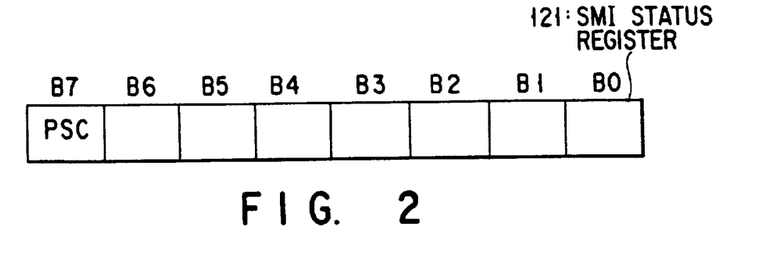
FIG. 2 is a view showing an SMI (system management interrupt) status register allocated in the computer system of the embodiment shown in FIG. 1.

The I/O gate array 12 is allocated with an SMI status register 121. The SMI status register 121 indicates source device status of an SMI signal, and comprises an 8-bit register, as shown in FIG. 2. When an SMI signal is generated in response to a request from the PSC 31, "1" is set in bit 7 (B7) of the SMI status register 121.

The main memory 13 has a storage capacity of 4 Mbytes in a standard model, and stores the OS, an application program to be processed, user data created by an application program, and the like. The OS includes an I/O system for supporting a pen input operation, and is designed to operate in the protect mode of the CPU 11. The OS includes a suspend processing program for saving user data in the main memory 13 in a hard disk 35 when the system enters the suspend mode. As the OS, for example, "PenPoint" (commercially available from GO Corporation, USA; "Pen-Point" is a trademark of GO Corporation) can be used. Hereinafter, this OS will be referred to as a special OS and the suspend processing executed by the OS will be referred to as special OS suspend processing.

The SM-RAM 14 is arranged to realize a power management function of this system, and has a storage capacity of 32 Kbytes. The SM-RAM 14 is an overlay mapped on an address space from address 60000H to address 67FFFH of the main memory 13, and can be accessed only when an SMI signal is input to the CPU 11. Since the SM-RAM 14 and the main memory are accessed by switching banks, original data in the main memory will not be destroyed when the SM-RAM is overlaid. When the system enters the suspend mode, system status data necessary for restarting an application program, i.e., status data of registers of the CPU 11 and various hardware devices upon generation of the SMI, are saved in the SM-RAM 14 in the form of stacks.

The expansion memory card 25 is connected as an option to a special-purpose 88-pin card slot provided to the computer main body. The expansion memory card 25 is a special-purpose DRAM card, and 2-, 4-, 8-, and 16-Mbyte cards, and the like are available.

The BIOS-ROM 15 stores the BIOS (basic I/O system), and comprises a flash memory to allow program rewriting. The BIOS is designed to operate in the real mode. The BIOS includes an IRT routine for testing and initializing the memories and various hardware devices in a power-ON state, various device drivers for controlling various hardware devices in accordance with requests from the OS, the SMI service program including the suspend SMI routine and the resume SMI routine, an SMI handler for determining an SMI service routine to be executed, and the like.

The SMI handler is a program in the BIOS, which is started first when the SMI is generated. This program checks generation source status of the SMI, and executes calling of an SMI service routine corresponding to the generation status.

The RTC 16 is a timepiece module having its own operating battery, and has a CMOS type static RAM (to be referred to as a CMOS memory hereinafter) which is always supplied with a power supply voltage from the battery. The CMOS memory is utilized to store, e.g., setup information indicating the system configuration. The CMOS memory is allocated with an SMI status flag register 161, which is set with, e.g., a flag indicating an SMI status check result by the SMI handler.

Figure 3:
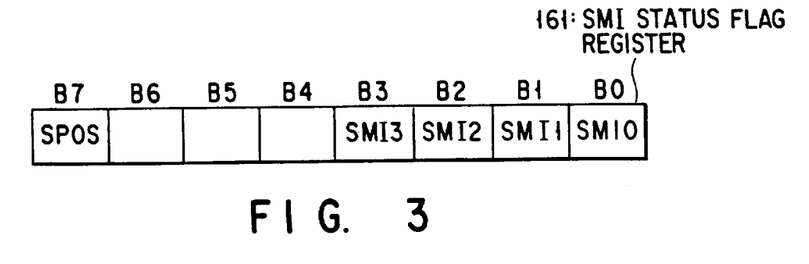
FIG. 3 is a view showing an SMI status flag register allocated in the computer system of the embodiment shown in FIG. 1.

FIG. 3 shows a content of the SMI status flag register 161.

As shown in FIG. 3, the SMI status flag register 161 comprises an 8-bit register, and a special OS operating flag (SPOS) set in bit 7 (B7) indicating whether or not the special OS is operating. An SPOS of "1" indicates that the special OS is operating, and an SPOS of "0" indicates that the special OS is not operating. The SPOS is set with "1" when the special OS is bootloaded in the main memory 13. A 4-bit value of bit 3 to bit 0 (B3 to B0) gives the SMI status. For example, when the 4-bit value is "0000", it indicates that no SMI is generated; when the 4-bit value is "0001", it indicates that a suspend SMI is generated in response to an OFF operation of the power switch 311; and when the 4-bit value is "1001", it indicates that a resume SMI is generated in response to an ON operation of the power switch 311.

The SI 26 is connected to the PSC 31 and an RS232C connector 34, and performs communication control between them using serial data. Also, the circuit 26 is connected to a floppy disk connector (FDD connector) 32, a printer/floppy disk connector (PRT/FDD connector) 33, the hard disk drive (HDD) 35, and a tablet controller 36, and performs communication control among them using parallel data.

Figure 4:
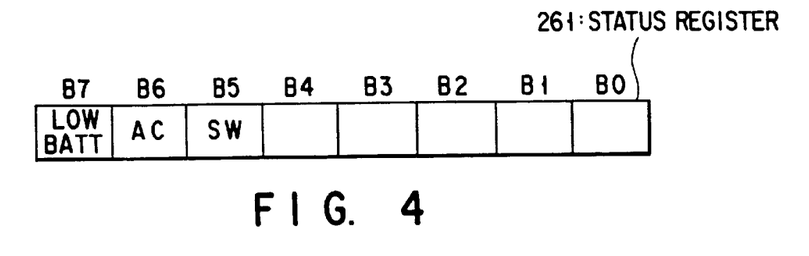
FIG. 4 is a view showing a status register allocated in the computer system of the embodiment shown in FIG. 1.

The SI 26 is allocated with a status register 261. The status register 261 indicates the state of the PSC 31, and comprises an 8-bit register, as shown in FIG. 4.

Bit 7 (B7) of the status register 261 indicates the presence/absence of a low battery state. When the low battery state is detected, "1" is set in bit 7; otherwise, "0" is set. Bit 6 (B6) indicates the presence/absence of connection of an AC adapter 313. When the AC adapter is connected, "1" is set in bit 6; otherwise, "0" is set. Bit 5 (B5) indicates the ON/OFF state of the power switch 311. When the power switch 311 is turned off, "1" is set in bit 5; otherwise, "0" is set.

The PSC 31 controls power supply to respective units in accordance with instructions from the CPU 11, and communications with the CPU 11 are executed via a command register in the SI 26. When the power switch 311 is turned off, the PSC 31 supplies an SMI generation request signal to the I/O gate array 12, and sets "0" in bit 5 of the status register 261. Also, when a low battery state is detected, the PSC 31 generates an SMI generation request signal to the I/O gate array 12, and sets "1" in bit 7 of the status register 261.

Furthermore, even when the system is in a power-OFF state, the PSC 31 generates a backup power supply voltage BK, and supplies the voltage to the main memory 13, the SM-RAM 14, and an image memory (VRAM) 38.

The floppy disk connector 32 is a connector which is used when a floppy disk drive (first FDD) 42 is connected as an option, and the printer/floppy disk connector 33 is a connector which is used when a printer or a floppy disk device (second FDD) 43 is connected as an option.

The tablet controller 36 detects a coordinate point input by a stylus pen via a transparent tablet 37, and supplies the detected coordinate point data to the I/O gate array 12 via the SI 26 and the system bus 2.

The liquid crystal controller 27 performs display control of a liquid crystal display panel 39. The controller 27 develops display data sent from the CPU 11 via the system bus 2 onto the VRAM 38, and displays the developed data on the liquid crystal display panel 39. The liquid crystal display panel 39 comprises a 640 dots (vertical direction)× 480 dots (horizontal direction) dot matrix, and is of a transmission type. For example, a back light unit 40 using a fluorescent display tube (to be referred to as an "FL" hereinafter) is arranged on the back surface side of the panel 39.

The IC card controllers 28 and 29 perform read/write control of 68-pin PCMCIA (Personal Computer Memory Card International Association) cards 44 and 45, respectively. The keyboard controller 30 performs key input control of a keyboard 46 which is connected as an option.

Figure 5:
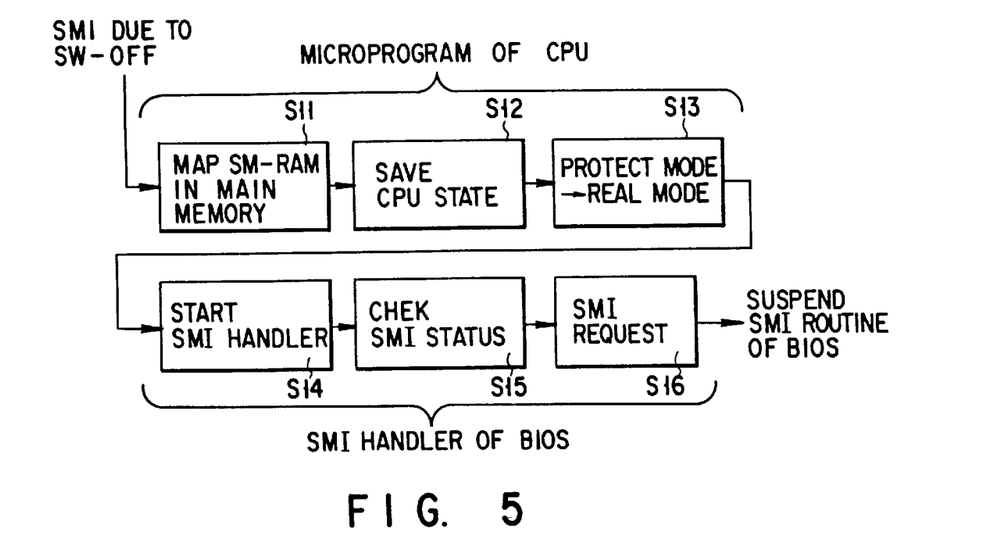
FIG. 5 is a diagram for explaining operations starting from the moment when an SMI interrupt is generated in the computer system of the embodiment shown in FIG. 1 until a suspend SMI routine of the BIOS is called.

The operation flow from the moment when the power switch 311 is turned off until the suspend SMI routine of the BIOS is called will be described below with reference to FIG. 5.

When an operator turns off the power switch 311, the PSC 31 sets "1" in bit 5 of the status register 261 of the SI 26 to inform the OFF operation of the switch 311 to the CPU 11, and supplies an SMI request signal to the I/O gate array 12. The I/O gate array 12 sets "1" in bit 7 of the SMI status register 121 in response to the SMI request signal from the PSC 31, and supplies a low-level SMI signal to an SMI pin of the CPU 11.

When the low-level SMI signal is input to the SMI pin of the CPU 11, the CPU 11 maps the SM-RAM 14 on the 32-Kbyte memory space from address 60000H to address 67FFFH of the main memory 13 (step S11). With this memory mapping, an access to the memory space from address 60000H to address 67FFFH of the main memory 13 is disabled, and an access to the SM-RAM 14 is enabled instead.

Figure 6:
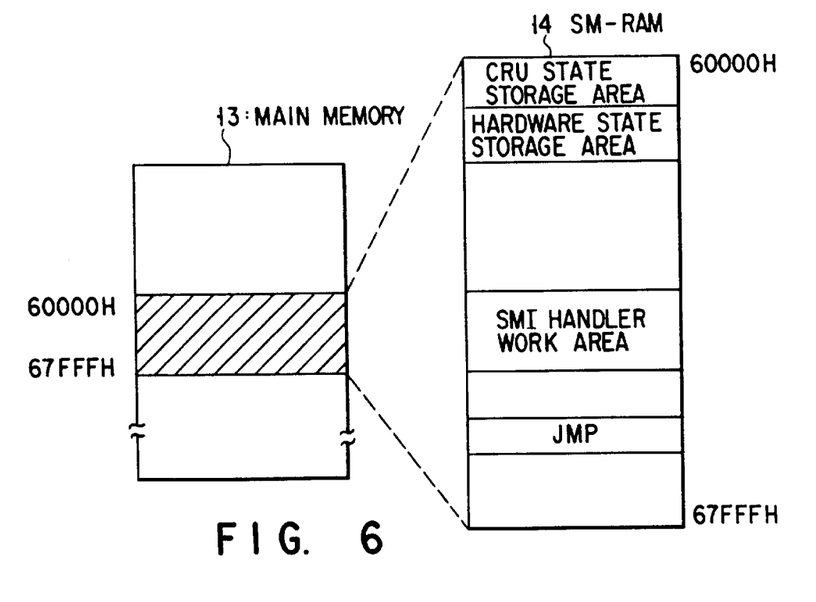
FIG. 6 is a memory map of an SM-RAM arranged in the computer system of the embodiment shown in FIG. 1.

The memory map of the SM-RAM 14 is as shown in FIG. 6. More specifically, the SM-RAM 14 is allocated with a CPU state storage area, a hardware state storage area, and an SMI handler work area, and is set with a jump code for designating the SMI handler of the BIOS-ROM 15 as an interrupt destination.

The CPU 11 saves the contents (CPU state) of various registers of the CPU 11 upon reception of the SMI signal in the CPU state storage area of the SM-RAM 14 in the form of stacks (step S12). If the SMI signal is input during an operation of the special OS, the CPU state of the protect mode is saved in the SM-RAM 14. The CPU 11 changes its operation mode to the real mode, and fetches a jump code set at a predetermined address of the SM-RAM 14 (step S13). The processing operations in steps S11 to S13 so far are executed by a microprogram of the CPU 11.

Then, the CPU 11 executes the SMI handler of the BIOS-ROM 15 designated by the jump code (step S14). The SMI handler checks the SMI generation status so as to determine the SMI generation source (step S15).

In this processing, the content of the SMI status register 121 and the content of the status register 261 are checked. When an SMI is generated in response to the OFF operation of the power switch, "1" is set in both bit 7 of the SMI status register 121 and bit 5 of the status register 261, as described above. In this case, the SMI handler determines that the SMI is generated in response to the OFF operation of the power switch 311, and requests execution of a predetermined SMI service routine of the BIOS corresponding to the SMI, i.e., the suspend SMI routine (step S16). The processing operations in steps S14 to S16 are executed by the SMI handler.

Figure 7:
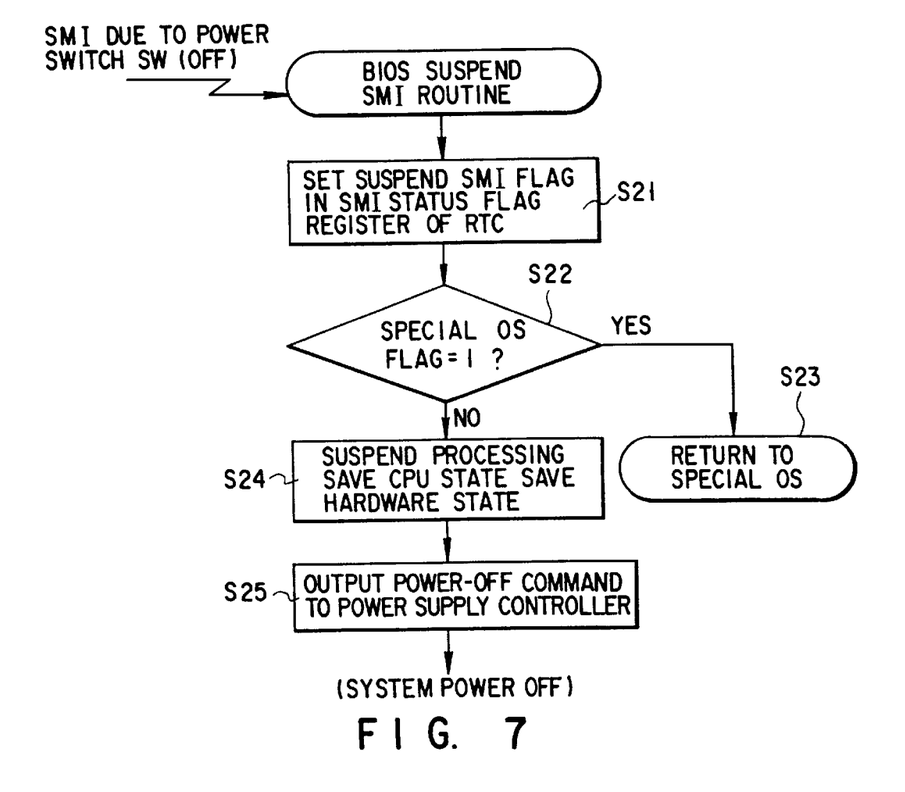
FIG. 7 is a flow chart for explaining a suspend SMI routine of the BIOS in the computer system of the embodiment shown in FIG. 1.

An operation executed in the suspend SMI routine of the BIOS will be described below with reference to FIG. 7.

The suspend SMI routine sets a suspend SMI flag indicating that a suspend SMI is generated in response to an OFF operation of the power switch 311 in the SMI status flag register 161 of the RTC 16 (step S21). At this time, the lower four bits B3, B2, B1, and B0 of the SMI status flag register 161 are set to be 0, 0, 0, and 1, respectively.

The suspend SMI routine looks up the SPOS in bit 7 of the SMI status flag register 161 to check if the special OS is operating (step S22). The SPOS is set to be "1" when the special OS is boot-loaded. For this reason, when the special OS is operating, SPOS="1" is set; otherwise, SPOS="0" is set.

If SPOS="1", the suspend SMI routine executes a predetermined return command to return the control to the special OS, so that the special OS suspend processing is executed first by the special OS (step S23). Upon execution of the return command, CPU state data saved in the SM-RAM 14 are restored to the registers of the CPU 11, and the special OS processing is restarted, commencing at a state immediately before the SMI signal is input.

On the other hand, if SPOS ="0", the suspend SMI routine executes suspend processing (step S24). In this suspend processing, CPU state data and hardware state data are saved in the SM-RAM 14. At this time, the CPU state data to be saved are the values of the registers of the CPU in the real mode. Then, the suspend SMI routine supplies a power-OFF command to the PSC 31 via the I/O gate array 12, the system bus 2, and the SI 26 (step S25). In response to this command, the system is set in the suspend mode, and almost all of the devices in the system, except for the main memory 13, SM-RAM 14, and VRAM 38 which are supplied with the backup power supply voltage BK, are set in a power-OFF state.

Figure 8:
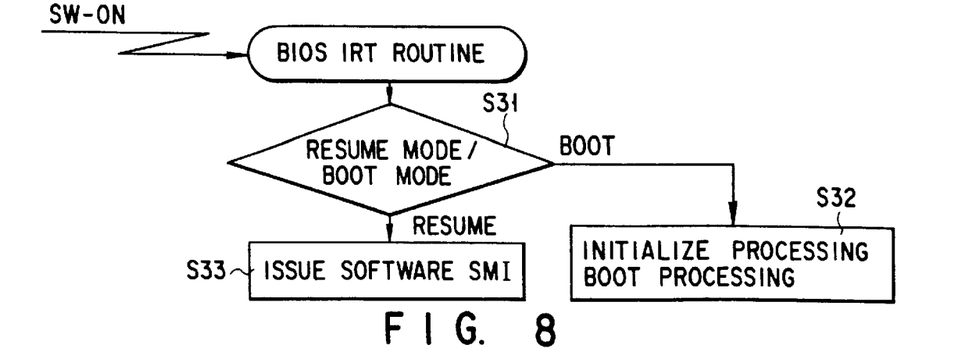
FIG. 8 is a flow chart for explaining an IRT routine of the BIOS in the computer system of the embodiment shown in FIG. 1.
Figure 9:
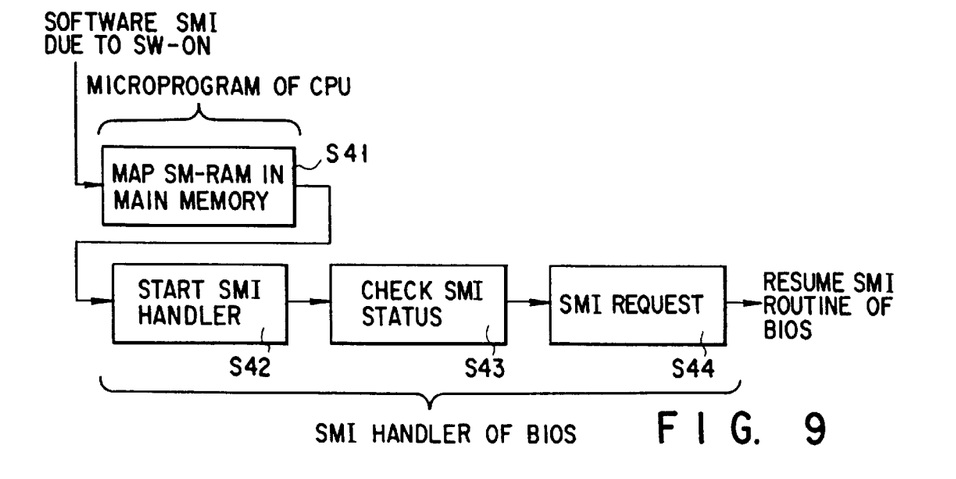
FIG. 9 is a diagram for explaining operations starting from the moment when an SMI interrupt is generated in the computer system of the embodiment shown in FIG. 1 until a resume SMI routine of the BIOS is called.

The operation flow from the moment when the power switch 311 is turned on until the resume SMI routine of the BIOS is called will be described below with reference to FIGS. 8 and 9.

When an operator turns on the power switch 311, the PSC 31 turns on the power supply of the system. Thereafter, the PSC 31 sets "0" in bit 5 of the status register 261 of the SI 26 to inform the ON operation of the power switch 311 to the CPU 11, and supplies a reset request signal to the I/O gate array 12. In response to the reset request signal from the PSC 31, the I/O gate array 12 supplies a reset signal to the CPU 11.

Upon reception of the reset signal, the CPU 11 is automatically set in the real mode. Then, an IRT (Initial Reliability Test) routine of the BIOS for starting up the system is executed.

The IRT routine of the BIOS checks by looking up the system setup data set in the CMOS memory of the RTC 16 whether a user sets a resume mode or a boot mode (step S31).

If the boot mode is selected, the IRT routine executes a memory test and a hardware test, and initializes hardware devices according to the system setup data set in the CMOS memory. Thereafter, the IRT routine bootloads the special OS in the main memory 13, and changes the operation mode of the CPU 11 to the protect mode (step S32).

If the resume mode is selected, the IRT routine issues a software SMI (step S33). In response to the software SMI, "1" is set as the value of a predetermined register of the CPU 11, and processing shown in FIG. 9 is started.

More specifically, when the software SMI is issued, the CPU 11 maps the SM-RAM 14 on the 32-Kbyte memory space from address 60000H to address 67FFFH of the main memory 13 (step S41), and fetches a jump code set at a predetermined address of the SM-RAM 14 (step 41).

Then, the CPU 11 executes the SMI handler of the BIOS-ROM 15 designated by the jump code (step S42). The SMI handler checks SMI generation status so as to determine the SMI generation source (step S43).

In this processing, the content of the SMI status register 121 and the content of the status register 261 are checked. When an SMT is generated in response to the ON operation of the power switch, "1" is set in bit 7 of the SMI status register 121, and "0" is set in bit 5 of the status register 261, as described above. In this case, the SMI handler determines that the SMI due to the ON operation of the power switch 311 is generated, and requests execution of a predetermined SMI service routine of the BIOS corresponding to the SMI, i.e., the resume SMI routine (step S44).

Figure 10:
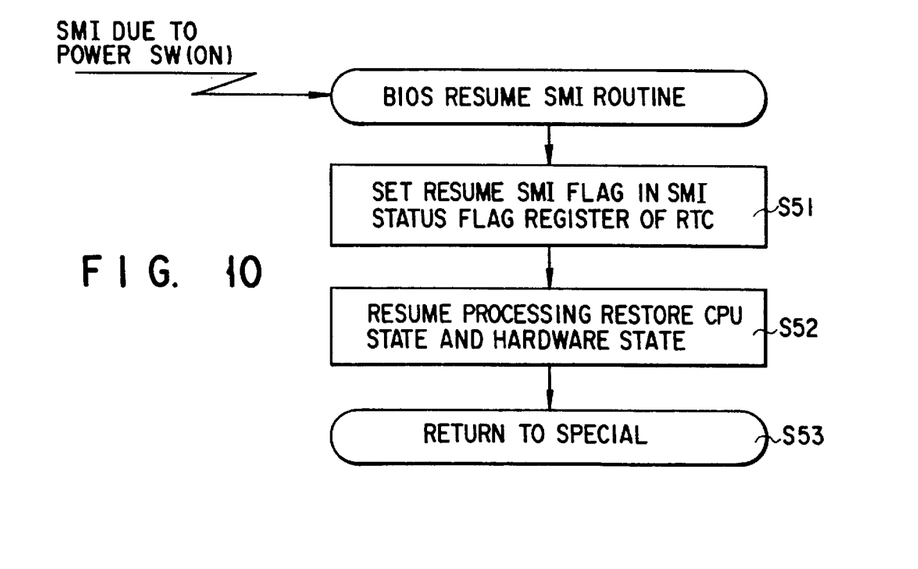
FIG. 10 is a flow chart for explaining a resume SMI routine of the BIOS in the computer system of the embodiment shown in FIG. 1.

The operation executed in the resume SMI routine of the BIOS will be described below with reference to FIG. 10.

The resume SMI routine sets the suspend SMI flag indicating that the suspend SMI due to the ON operation of the power switch 311 is generated, in the SMI status flag register 161 of the RTC 16 so as to inform the ON operation of the power switch 311 to the special OS (step S51). At this time, the lower four bits B3, B2, B1, and B0 of the SMI status flag register 161 are set to be 1, 0, 0, and 1, respectively.

Then, the resume SMI routine restores CPU state data and hardware state data saved in the SM-RAM 14 in the suspend SMI routine (step S52). Thereafter, the resume SMI routine executes a predetermined return command to return the control to the special OS (step S53). Upon execution of the return command, processing of the special OS is restarted at a state immediately before the system is set in the suspend mode.

Figure 11:
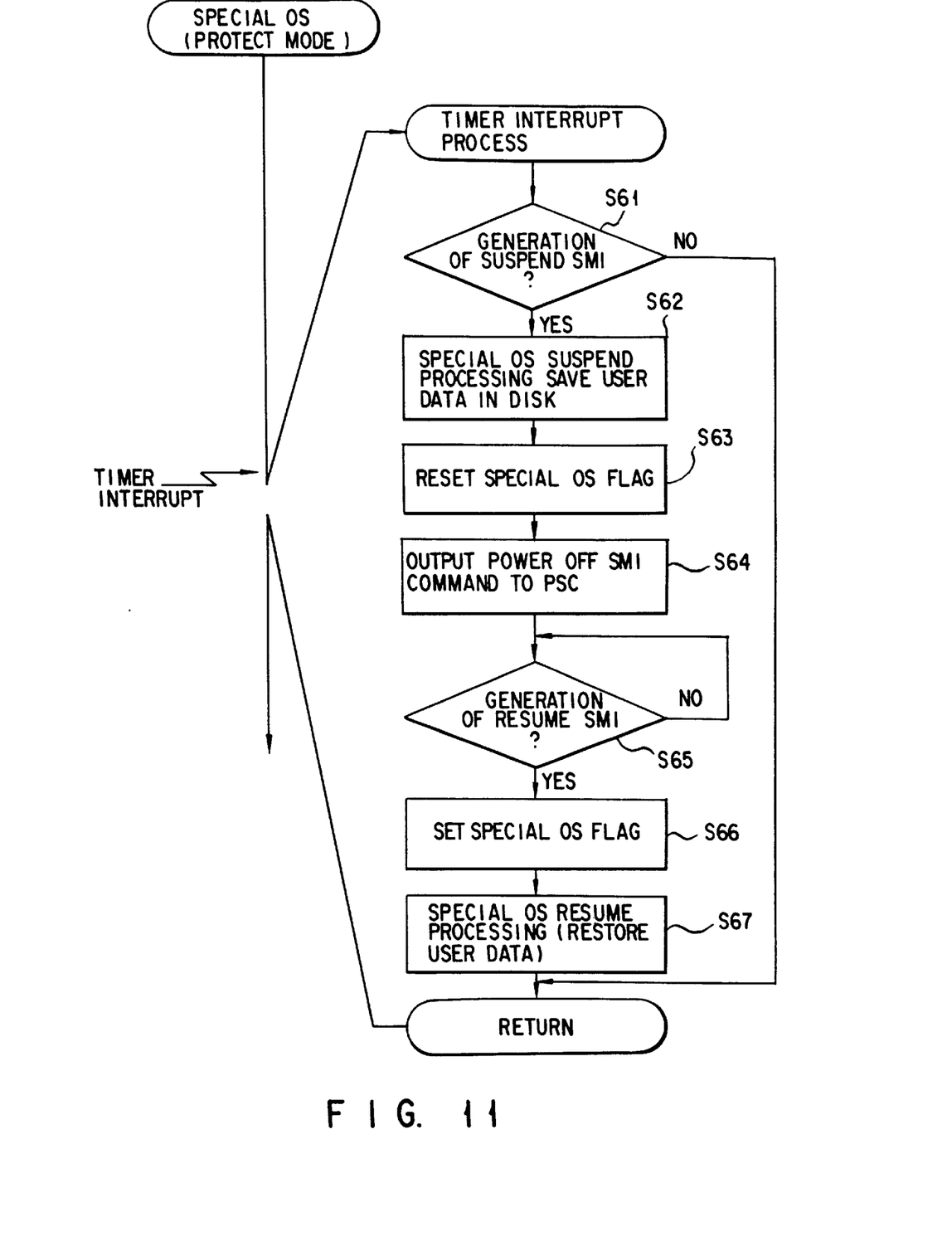
FIG. 11 is a flow chart for explaining a timer interrupt routine of the OS in the computer system of the embodiment shown in FIG. 1.

The special OS suspend processing and the special OS resume processing executed by the special OS will be described below with reference to FIG. 11.

The special OS suspend processing and the special OS resume processing are included in a timer interrupt processing routine of the special OS. The timer interrupt processing routine is executed in response to a timer interrupt signal periodically supplied from the I/O gate array 12 to the CPU 11 during the operation period of the special OS.

The timer interrupt processing routine of the special OS checks by looking up the lower four bits of the SMI status flag register 161 of the RTC 16 whether a suspend SMI due to an OFF operation of the power switch 311 is generated (step S61). When the suspend SMI due to the OFF operation of the power switch 311 is generated, the lower four bits of the SMI status flag register 161 are set to be "0001" by the suspend SMI routine of the BIOS. Also, when a suspend SMI due to a low battery state is generated, the lower four bits of the SMI status flag register 161 are set to be "0010" by the suspend SMI routine of the BIOS.

Therefore, when the lower four bits are "0001" or "0010", the timer interrupt processing routine of the special OS determines that a suspend SMI is generated, and the control advances to step S62 and subsequent steps. On the other hand, when the lower four bits are neither "0001" nor "0010", the control returns from the interrupt routine.

When a suspend SMI due to an OFF operation of the power switch 311 or a low battery state is generated, the timer interrupt processing routine executes the special OS suspend processing (step S62). In this special OS suspend processing, user data such as document data, table data, and the like created by an application program and developed in the main memory 13 are saved in the hard disk 35.

Then, the timer interrupt processing routine resets the SPOS of the SMI status flag 161 to "0" (step S63), and thereafter, issues a power-OFF SMI command to the PSC 31 (step S64). The power-OFF SMI command causes the PSC 31 to execute the same processing as that executed upon detection of the OFF operation of the power switch 311, except that the content of status set in the status register 261 is not the status indicating the OFF operation of the power switch 311 but the status indicating that the power-OFF operation is designated by a command. As a result, a low-level SMI signal is supplied again to the SMI pin of the CPU 11, and the suspend SMI processing routine of the BIOS is executed again.

After the timer interrupt processing routine issues the power-OFF SMI command, the interruption remains until the lower four bits of the SMI status flag register 161 are set to be "1001", indicating that a resume SMI due to an ON operation of the power switch 311 is generated (step S65).

When the lower four bits of the SMI status flag register 161 are set to be "1001", the timer interrupt processing routine sets "1" in the SPOS of the SMI status flag register 161 (step S66), and thereafter, restores user data saved in the hard disk 35 in step S62 to the main memory 13 (step S67). Then, the control returns from the timer interrupt processing routine to a state immediately before the timer interrupt is generated.

A series of operations starting from the step when the system is set in the suspend mode until the system is resumed from the suspend mode will be described below with reference to FIG. 12.

When an operator turns off the power switch 311 in a state wherein the special OS is operating, a low-level SMI signal is supplied to the SMI pin of the CPU 11. In response to the SMI signal due to the OFF operation of the power switch 311, the CPU 11 saves CPU state data of the protect mode in the SM-RAM 14. Thereafter, the CPU 11 changes its operation mode from the protect mode to the real mode, and executes the suspend SMI routine of the BIOS.

The suspend SMI routine of the BIOS sets a suspend SMI flag indicating that a suspend SMI due to an OFF operation of the power switch 311 is generated, in the SMI status flag register 161 of the RTC 16 (step S21). At this time, the lower four bits B3, B2, B1, and B0 of the SMI status flag register 161 are set to be 0, 0, 0, and 1, respectively.

The suspend SMI routine looks up the SPOS in bit 7 of the SMI status flag register 161 to check whether the special OS is operating (step S22). The SPOS is set to be "1" when the special OS is boot-loaded. For this reason, when the special OS is operating, SPOS="1" is set; otherwise, SPOS="0" is set.

If SPOS="1", the suspend SMI routine executes a predetermined return command to return the control to the special OS, so that the special OS suspend processing is executed first by the special OS (step S23). Upon execution of the return command, CPU state data saved in the SM-RAM 14 are restored to the registers of the CPU 11, and the special OS processing is restarted at a state immediately before the SMI signal is input.

When a timer interrupt is generated, the special OS enters the timer interrupt processing routine. The timer interrupt processing routine checks by looking up the lower four bits of the SMI status flag register 161 of the RTC 16 whether a suspend SMI due to an OFF operation of the power switch 311 is generated (step S61). In this case, the lower four bits of the SMI status flag register 161 have already been set to be "0001" by the suspend SMI routine of the BIOS. Therefore, the timer interrupt processing routine of the special OS executes the special OS suspend processing (step S62).

In this special OS suspend processing, user data such as document data, table data, and the like created by an application program and developed on the main memory 13 are saved in the hard disk 35.

Then, the timer interrupt processing routine resets the SPOS of the SMI status flag 161 to "0" (step S63), and thereafter, issues a power-OFF SMI command to the PSC 31 (step S64). The power-OFF SMI command causes the PSC 31 to execute the same processing as that executed upon detection of the OFF operation of the power switch 311. As a result, a low-level SMI signal is supplied to the SMI pin of the CPU 11 again. The flow then advances to step S65, and the timer interrupt processing routine continues until the generation of a resume SMI.

In response to the re-generated SMI signal, the CPU 11 saves CPU state data of the protect mode in the SM-RAM 14, changes its operation mode from the protect mode to the real mode, and executes the suspend SMI routine of the BIOS. At this time, the CPU status data saved in the SM-RAM 14 is the status in step S65 in the timer interrupt processing routine of the special OS.

The suspend SMI routine of the BIOS sets a suspend SMI flag indicating that a suspend SMI due to an OFF operation of the power switch 311 is generated in the SMI status flag register 161 of the RTC 16 (step S21). At this time, the lower four bits B3, B2, B1, and B0 of the SMI status flag register 161 are set to be 0, 0, 0, and 1, respectively.

The suspend SMI routine looks up the SPOS in bit 7 of the SMI status flag register 161 to check whether the special OS is operating (step S22). Since the SPOS has already been reset to "0" by the special OS, the suspend SMI routine, in turn, executes suspend processing (step S24).

In this suspend processing, CPU state data and hardware state data are saved in the SM-RAM 14. The CPU state data saved at this time include the values of the CPU's registers in the real mode. The suspend SMI routine supplies a power-OFF command to the PSC 31 via the I/O gate array 12, the system bus 2, and the SI 26 (step S25). In response to this command, the system is set in the suspend mode, and almost all of the devices in the system, except for the main memory 13, SM-RAM 14, and VRAM 38 which are supplied with the backup power supply voltage BK, are set in a power-OFF state.

When an operator turns on the power switch 311 in a state wherein the system is set in the suspend mode, the PSC turns on the system. Thereafter, the CPU 11 executes the IRT routine of the BIOS in response to a reset signal from the PSC 31, and a software SMI is issued in this routine.

When the software SMI due to the ON operation of the power switch 311 is issued, the resume SMI routine of the BIOS is executed.

The resume SM1 routine sets the suspend SMT flag indicating that a suspend SMI due to an ON operation of the power switch 311 is generated, in the SMT status flag register 161 of the RTC 16 so as to inform the ON operation of the power switch 311 to the special OS (step S51). At this time, the lower four bits B3, B2, B1, and B0 of the SMI status flag register 161 are set to be 1, 0, 0, and 1, respectively.

Then, the resume SMI routine restores CPU state data and hardware state data saved in the SM-RAM 14 in the suspend SMI routine (step S52). Thereafter, the resume SMI routine executes a predetermined return command to return the control to the special OS (step S53). Upon execution of the return command, the timer interrupt processing of the special OS is restarted at a state immediately before the system is set in the suspend mode, i.e., from step S65.

When the timer interrupt processing routine confirms the setting of the suspend SMI flag which indicates that a suspend SMI due to an ON operation of the power switch 311 is generated, it sets "1" in the SPOS of the SMI status flag register 161 (step S66), and thereafter, restores user data saved in the hard disk 35 in step S62 to the main memory 13 (step S67). Then, the control returns from the timer interrupt processing routine to a state immediately before the timer interrupt is generated.

As described above, in the system of this embodiment, when an OFF operation of the power switch 311 is detected, the suspend processing of the special OS is executed to save user data on the hard disk 35. Upon completion of the suspend processing of the special OS, the suspend processing of the BIOS is executed in turn, thereby saving status data of the computer system in the SM-RAM 14, and the computer system is set in a power-OFF state. In this manner, when the power switch 311 in this suspend control system is turned off, both the suspend processing of the special OS and the suspend processing of the BIOS are executed, thereby executing the processing for saving user data in the hard disk, in conjunction with the processing for saving status data of the computer system in the SM-RAM 14. Therefore, even when, for example, the remaining capacity of the battery 312 decreases during the power-OFF period of the system, and user data in the main memory 13 are lost, the user data in the hard disk 35 still remain. For this reason, the loss of user data due to a decrease in remaining battery capacity can be prevented.

Figure 12:
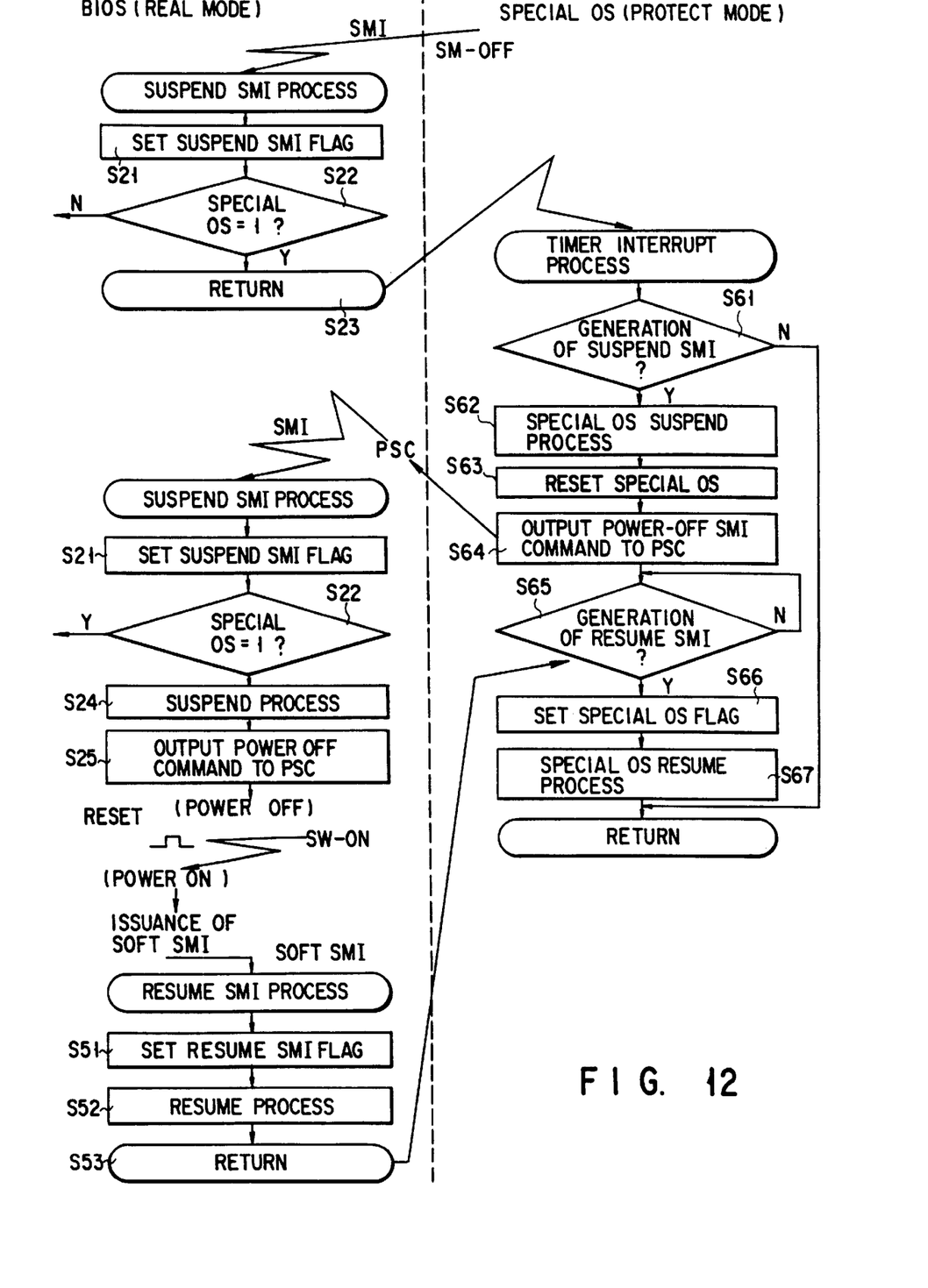
FIG. 12 is a flow chart for explaining a series of operations starting from the moment when the computer system of the embodiment shown in FIG. 1 is set in a suspend mode until the system is resumed from the suspend mode.

In FIG. 12, the system is set in the suspend mode when the power switch 311 is turned off. The system is also set in the suspend mode when the low battery state is detected by the PSC 31. The suspend processing in this case is the same as that executed in response to the OFF operation of the power switch 311. That is, the special OS suspend processing for saving user data in the hard disk 35 and the BIOS suspend processing for saving system status data in the SM-RAM 14 are executed in cooperation with each other.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A suspend control system of a computer system having a CPU provided with a system management mode for accessing a predetermined memory space and a protect mode with a memory addressing method different from the system management mode, said suspend control system comprising:

a memory unit for storing processing data of said computer system;

secondary storage means storing processing data of said computer system, if any;

system management means for managing an operation of said computer system, said system management means having first suspend means for executing first suspend processing for saving, in said secondary storage means, user data stored in said memory unit, the system management means including an operating system which is designed to operate in the protect mode;

flag means for indicating whether or not the operating system supports the first suspend means;

second suspend means, connected to said memory unit, said secondary storage means, and said system management means, for executing second suspend processing for saving status data of said computer system in said memory unit;

power supply means, connected to said second suspend means, having a switch for controlling power management of said computer system;

means for determining whether or not the operating system supports the first suspend means by referring to the flag means in response to an OFF operation of said switch, and causing said first suspend means of said system management means to execute the first suspend processing if the operating system supports the first suspend means as a result of the determination; and means for causing said second suspend means to execute the second suspend processing in response to the end of execution of the first suspend processing by said first suspend means.

2. A system according to claim 1, wherein said second suspend means includes a basic input/output program for controlling the hardware of said computer system, and the basic input/output program is designed to operate in the first operation mode.

3. A system according to claim 1, wherein said means for executing the first suspend processing comprises means for setting interrupt status data indicating generation of an interrupt processing request in a predetermined register in response to an interrupt signal indicating an OFF operation of said power switch, and said first suspend means executes the first suspend processing in response to the setting of the interrupt status data.

4. The system according to claim 1, wherein the flag means is reset after the end of execution of the first suspend processing by the first suspend means.

5. The system according to claim 1, wherein the flag means is set after the end of execution of the second suspend processing by the second suspend means.

6. A suspend control method of a computer system having a CPU provided with a system management mode for accessing a predetermined memory space and a protect mode with a memory addressing method different from the system management mode, and having an operating system which is designed to operate in the protect mode, said method comprising the steps of:

detecting an OFF operation of a switch for controlling power management of said computer system;

determining, in response to the detection of the OFF operation of the switch, whether or not the operating system supports a suspend processing by referring to a flag indicating that the operating system supports the suspend processing;

saving user data stored in a memory unit in a secondary storage device in response to the determination of the operating system supporting the suspend processing;

saving status data of said computer system in said memory unit in response to the end of the saving processing of the user data; and turning off a power supply of said system in response to the end of the saving processing of the status data of said computer system.

7. A suspend control system of a computer system which can be operated by a battery, system having a CPU provided with a system management mode for accessing a predetermined memory space and a protect mode with a memory addressing method different from the system management mode, and having an operating system which is designed to operate in the protect mode, said suspend control system comprising:

a memory unit for storing processing data of said computer system;

system management means for managing an operation of said computer system, said system management means having first suspend means for executing first suspend processing for saving user data stored in said memory unit in a secondary storage device, the system management means including an operating system which is designed to operate in the protect mode;

flag means for indicating whether or not the operating system supports the first suspend means;

second suspend means, connected to said memory unit and said power supply, for executing second suspend processing for saving status data of said computer system in said memory unit;

means for detecting a decrease in remaining capacity of said battery, determining whether or not the operating system supports the first suspend means by referring to the flag means in response to the detection of the decrease in remaining capacity of said battery, and causing said first suspend means of said system management means to execute the first suspend processing if the operating system supports the first suspend means as a result of the determination; and means for causing said second suspend means to execute the second suspend processing in response to the end of execution of the first suspend processing by said first suspend means.

8. A resume control system of a computer system having a CPU provided with a system management mode for accessing a predetermined memory space and a protect mode with a memory addressing method different from the system management mode, said resume control system comprising:

a power supply having a switch for controlling power management of said computer system;

a memory unit to which processing data and status data of said computer system are restored;

secondary storage means for saving processing data of said computer system;

first resume means for executing first resume processing for restoring the status data of said computer system for restoring the status data of said computer system saved in said memory unit in response to an ON operation of switch;

system management means for managing an operation of said computer system, said system management means having second resume means for executing second resume processing for restoring the processing data saved in said secondary storage means to said memory unit, the system management means including an operating system which is designed to operate in the protect mode; and flag means for indicating whether or not the operating system supports the second resume means;

means for determining whether or not the operating system supports the second resume means by referring to the flag means; and means for causing said second resume means of said system management means to execute the second resume processing in response to the end of execution of the first resume processing by said first resume means if the determining means determines that the operating system supports the second resume means.

9. A system according to claim 8, wherein said first resume means includes a basic input/output program for controlling the hardware of said computer system, and the basic input/output program is designed to operate in the first operation mode.

10. A system according to claim 8, wherein said means for executing the second resume processing comprises means for setting interrupt status data indicating generation of an interrupt processing request in a predetermined register in response to an interrupt signal indicating an ON operation of said power switch, and said second resume means executes the second resume processing in response to the setting of the interrupt status data.

11. A suspend/resume control system of a computer system having a CPU provided with a system management mode for accessing a predetermined memory space and a protect mode with a memory addressing method different from the system management mode, said suspend/resume control system comprising a memory unit for storing processing data of said computer system;

secondary storage means storing processing data of said computer system, if any;

system management means for managing an operation of said computer system, said system management means having first suspend means for executing first suspend processing for saving user data stored in said memory unit in said secondary storage means, the system management means including an operating system which is designed to operate in the protect mode;

flag means for indicating whether or not the operating system supports the first suspend means;

second suspend means, connected to said memory unit, said secondary storage means, and said system management means, for executing second suspend processing for saving status data of said computer system in said memory unit;

power supply means, connected to said second suspend means, having a switch for controlling power management of said computer system;

means for determining whether or not the operating system supports the first suspend means in response to an OFF operation of said switch, and causing said first suspend means of said system management means to execute the first suspend processing if the operating system supports the first suspend means as a result of the determination;

means for causing said second suspend means to execute the second suspend processing in response to the end of execution of the first suspend processing by said first suspend means;

first resume means for executing first resume processing for restoring status data of said computer system saved in said memory unit in response to an ON operation of said switch;

second resume means, arranged in said system management means, for executing second resume processing for restoring the processing data of said computer system saved in said secondary storage means to said memory unit; and means for causing said second resume means of said system management means to execute the second resume processing in response to the end of executing the first resume processing by said first resume means.

12. A system according to claim 11, wherein said second suspend means includes a basic input/output program for controlling the hardware of said computer system, and the basic input/output program is designed to operate in the first operation mode.

13. A system according to claim 11, wherein said means for executing the first suspend processing comprises means for setting interrupt status data indicating generation of an interrupt processing request in a predetermined register in response to an interrupt signal indicating an OFF operation of said power switch, and said first suspend means executes the first suspend processing in response to the setting of the interrupt status data.

14. A system according to claim 11, wherein said first resume means includes a basic input/output program for controlling the hardware of said computer system, and the basic input/output program is designed to operate in the first operation mode.

15. A system according to claim 11, wherein said means for executing the second resume processing comprises means for setting interrupt status data indicating generation of an interrupt processing request in a predetermined register in response to an interrupt signal indicating an ON operation of said power switch, and said second resume means executes the second resume processing in response to the setting of the interrupt status data.

16. A suspend/resume control method of a computer system having a CPU provided with a system management mode for accessing a predetermined memory space and a protect mode with a memory addressing method different form the system management mode, and having an operating system which is designed to operate in the protect mode, said method comprising the computer steps of:

detecting an OFF operation of a switch for controlling Power management of said computer system;

determining, in response to the detection of the OFF operation of a switch, whether or not the operating system supports a resume processing by referring to a flag indicating that the operating system supports the resume processing;

saving user data stored in a memory unit in a secondary storage device in response to the determination of the operating system supports the resume processing;

saving status data of said computer system in said memory unit in response to the end of the saving processing of the user data;

turning off a power supply of said system in response to the end of the saving processing of the status data of said computer system;

detecting an ON operation of said switch;

restoring the status data of said computer system saved in said memory unit in response to the detection of the ON operation of said switch; and restoring the user data saved in said secondary storage device to said memory unit in response to the end of the restore processing of the status data of said computer system.

* * * * *

UNITED STATES PATENT AND TRADEMARK OFFICE
CERTIFICATE OF CORRECTION

PATENT NO.   : 5,845,134
DATED        : December 1, 1998
INVENTOR(S)  : Makoto ARAI It is certified that error appears in the above-indentified patent and that said Letters Patent is hereby corrected as shown below:

On the title page, item [73] should be:

--[73] Assignee: Kabushiki Kaisha Toshiba, Kawasaki-shi, Japan--

Signed and Sealed this

Twenty-fifth Day of May, 1999

Attest:

Q. TODD DICKINSON

Attesting Officer        Acting Commissioner of Patents and Trademarks

UNITED STATES PATENT AND TRADEMARK OFFICE
CERTIFICATE OF CORRECTION

PATENT NO.   : 5,845,134
DATED        : December 1, 1998
INVENTOR(S)  : Makoto ARAI It is certified that error appears in the above-indentified patent and that said Letters Patent is hereby corrected as shown below:

On the title page, item [73] should be:

Assignee: Kabushiki Kaisha Toshiba, Kawasaki-shi, Japan

Signed and Sealed this

Sixth Day of July, 1999

Attest:

Q. TODD DICKINSON

Attesting Officer      Acting Commissioner of Patents and Trademarks